US012675534B2

(12) United States Patent | (10) Patent No.: US 12,675,534 B2
Sood et al. | (45) Date of Patent: Jul. 7, 2026

(54) HYBRID TIERED STORAGE FOR CLOUD PLATFORMS

(71) Applicant: Microsoft Technology Licensing, LLC, Redmond, WA (US)

(72) Inventors: Armaan Sood, Bellevue, WA (US); Sam Detjen, Redmond, WA (US); Rodrigo Siqueira De Souza, Redmond, WA (US); Hanumantha R Kodavalla, Redmond, WA (US); Krishnan Sundaram, Redmond, WA (US); Hari Sudan Sundar, Redmond, WA (US); Sreekanth Kolla, Redmond, WA (US); Tamara Hass, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/742,848

(22) Filed: Jun. 13, 2024

(65) Prior Publication Data

US 2025/0384090 A1 Dec. 18, 2025

(51) Int. Cl.
*G06F 16/93* (2019.01)
*G06F 9/455* (2018.01)
(Continued)

(52) U.S. Cl.
CPC .......... *G06F 16/93* (2019.01); *G06F 9/45558* (2013.01); *G06F 16/322* (2019.01);
(Continued)

(58) Field of Classification Search
CPC .. G06F 16/322; G06F 16/328; G06F 16/3331; G06F 16/334; G06F 16/93;
(Continued)

(56) References Cited

U.S. PATENT DOCUMENTS 11,747,996 B2 * 9/2023 Senyuk ..................... G06F 1/10
711/164
2018/0089244 A1 * 3/2018 Velayudhan Pillai .. G06F 16/23
(Continued)

OTHER PUBLICATIONS

Saxena et al., "Real-Time LSM-Trees for HTAP Workloads," 2023 IEEE 39th International Conference on Data Engineering (ICDE), Anaheim, CA, USA, 2023, pp. 1208-1220, doi: 10.1109/ICDE55515. 2023.00097. (Year: 2023).*
(Continued)

*Primary Examiner* — James E Richardson

(57) ABSTRACT
According to examples, a cloud platform implementing a tiered storage that decouples Request Units from storage is disclosed. Data received from partitions that are characterized by corresponding partition keys is stored to the local storage medium of a virtual machine (VM) as hot data. The received data is formatted as immutable segments and stored to a disaggregated storage medium shared by a plurality of VMs. The immutable segments are grouped into sorted runs within the disaggregated storage medium and are further assigned to different levels. The hot data is deleted from a local storage medium when time-to-cold (TTC) criteria are met. The cold data can be accessed for document retrieval via a search key that includes a partition key and a documentID. Additional Request Units can be allocated or deallocated for a portion of the cold data without moving the cold data.

20 Claims, 9 Drawing Sheets

(51) Int. Cl.
| | |
|---|---|
| *G06F 16/31* | (2019.01) |
| *G06F 16/3331* | (2025.01) |
| *G06F 16/9035* | (2019.01) |

(52) U.S. Cl.
CPC ...... *G06F 16/3331* (2019.01); *G06F 16/9035* (2019.01); *G06F 2009/45562* (2013.01)

(58) Field of Classification Search
CPC ............. G06F 16/9035; G06F 9/45558; G06F 2009/45562
See application file for complete search history.

(56) References Cited

U.S. PATENT DOCUMENTS

| | | | | |
|---|---|---|---|---|
| 2019/0324676 | A1* | 10/2019 | Bensberg | G06F 3/0643 |
| 2019/0340274 | A1* | 11/2019 | Keller | G06F 16/2282 |
| 2020/0125531 | A1* | 4/2020 | Troshin | G06F 16/128 |
| 2020/0250148 | A1* | 8/2020 | Dayan | G06F 7/14 |
| 2020/0341889 | A1* | 10/2020 | Idreos | G06F 16/1734 |

OTHER PUBLICATIONS

Jaranilla et al., "Tiered Storage in Modern Key-Value Stores: Performance, Storage-Efficiency, and Cost-Efficiency Considerations," 2024 IEEE International Conference on Big Data and Smart Computing (BigComp), Bangkok, Thailand, 2024, pp. 151-158, doi: 10.1109/BigComp60711.2024.00032. (Year: 2024).*

"Azure Cosmos DB dedicated gateway—Overview", Retrieved From: https://learn.microsoft.com/en-us/azure/cosmos-db/dedicated-gateway, Oct. 8, 2024, 6 Pages.

"btree_builder.h", Retrieved From: https://users-cs.au.dk/rav/tpie/doc/master/btree_builder_8h_source.html, Retrieved on: Jun. 25, 2025, 5 Pages.

"Compactionary", Retrieved From: https://disc-projects.bu.edu/compactionary/research.html, Retrieved on: Jun. 25, 2025, 3 Pages.

"Copy Blob From URL", Retrieved From: https://learn.microsoft.com/en-us/rest/api/storageservices/copy-blob-from-url?tabs=microsoft-entra-id, Nov. 8, 2023, 11 Pages.

"Welcome to Avro!", Retrieved From: https://avro.apache.org/docs/1.2.0/, May 19, 2025, 2 Pages.

Garcia, et al., "cpp-btree", Retrieved From: https://github.com/Kronuz/cpp-btree/blob/master/btree/btree.h, Retrieved on: Jun. 25, 2025, 65 Pages.

Shneor, "Btree", Retrieved From: https://github.com/nimrodshn/btree, Retrieved on: Jun. 25, 2025, 5 Pages.

Anonymous, "Autoscaling Guidance—Azure Architecture Center—Microsoft Learn", Retrieved from the Internet URL: www.learn.microsoft.com/en-us/azure/architecture/best-practices/auto-scaling, Dec. 16, 2022, 09 pages.

Dong, et al., "Rocksdb: Evolution of development priorities in a key-value store serving large-scale applications", ACM Transactions on Storage, vol. 17, Issue No. 4, Oct. 2021, 32 pages.

Extended European search report received for European Application No. 25182327.4, mailed on Nov. 5, 2025, 12 pages.

Xu, et al., "Building a Fast and Efficient LSM-tree Store by Integrating Local Storage with Cloud Storage", ACM Transactions on Architecture and Code Optimization (TACO), vol. 19, Issue 3, May 25, 2022, pp. 1-26.

Dayan, et al., "Dostoevsky: Better Space-Time Trade-Offs for LSM-Tree Based Key-Value Stores via Adaptive Removal of Superfluous Merging", ACM, 2018, 16 pages.

* cited by examiner

400

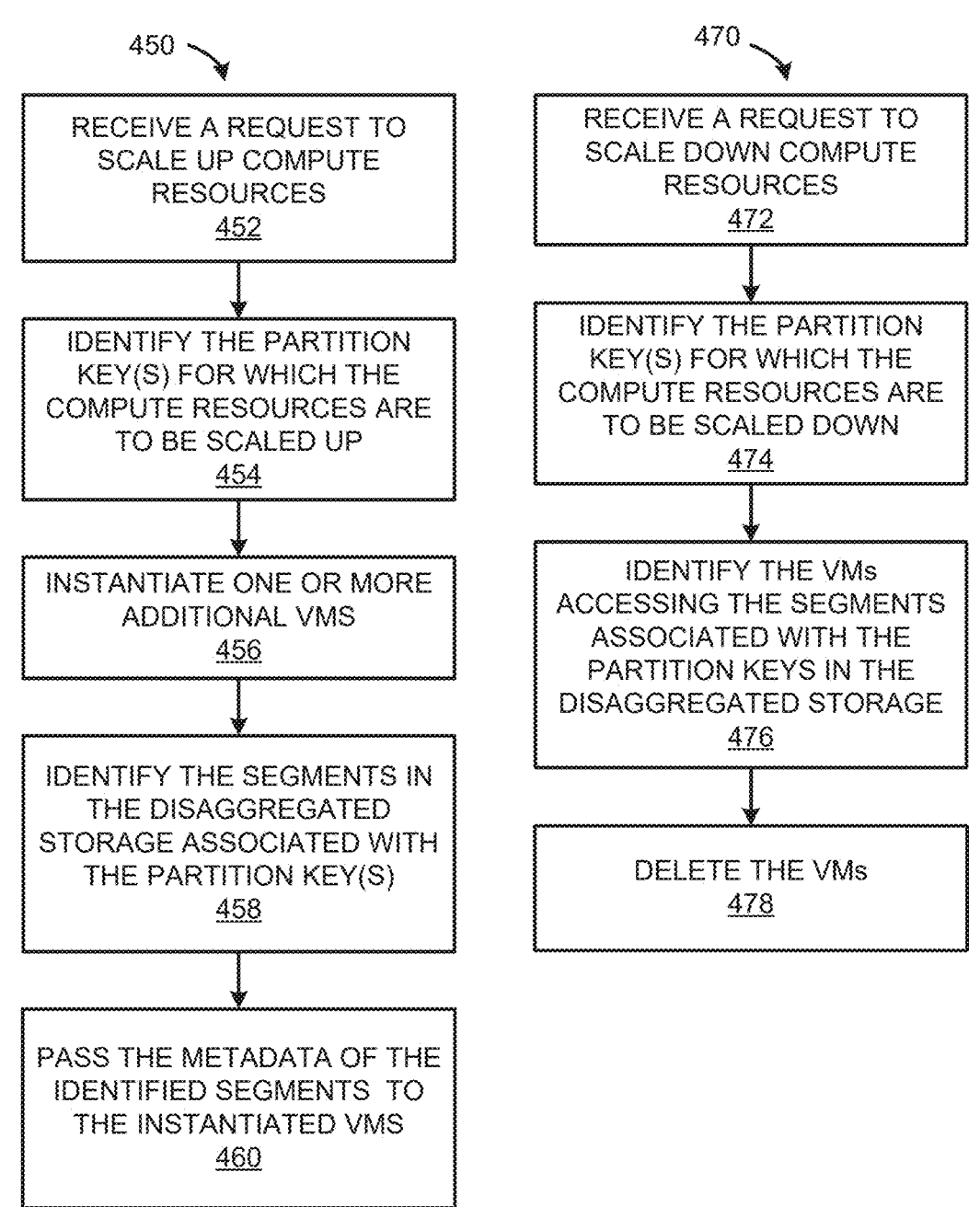

450

RECEIVE A REQUEST TO
SCALE UP COMPUTE
RESOURCES
452

IDENTIFY THE PARTITION
KEY(S) FOR WHICH THE
COMPUTE RESOURCES ARE
TO BE SCALED UP
454

INSTANTIATE ONE OR MORE
ADDITIONAL VMS
456

IDENTIFY THE SEGMENTS IN
THE DISAGGREGATED
STORAGE ASSOCIATED WITH
THE PARTITION KEY(S)
458

PASS THE METADATA OF THE
IDENTIFIED SEGMENTS  TO
THE INSTANTIATED VMS
460

470

RECEIVE A REQUEST TO
SCALE DOWN COMPUTE
RESOURCES
472

IDENTIFY THE PARTITION
KEY(S) FOR WHICH THE
COMPUTE RESOURCES ARE
TO BE SCALED DOWN
474

IDENTIFY THE VMs
ACCESSING THE SEGMENTS
ASSOCIATED WITH THE
PARTITION KEYS IN THE
DISAGGREGATED STORAGE
476

DELETE THE VMs
478

*FIG. 4B*

HYBRID TIERED STORAGE FOR CLOUD PLATFORMS

BACKGROUND

Cloud providers offer, among other services, globally distributed, horizontally partitioned, multi-model database services. Some services are designed to allow customers to elastically scale throughput along with the storage across several geographical regions while offering guaranteed low latency, high availability, predictable throughput, and multiple well-defined consistency models. A few cloud-based database services also offer comprehensive Service Level Agreements (SLAs) encompassing dimensions such as throughput, latency at the 99th percentile, availability, and consistency. However, the different architectures such as 'Shared nothing' or 'Serverless' architectures implemented by many of the database services on the cloud platforms tend to be inelastic which can result in non-optimal use of system resources.

BRIEF DESCRIPTION OF DRAWINGS

Features of the present disclosure are illustrated by way of examples shown in the following figures. In the following figures, like numerals indicate like elements, in which:

FIG. 4B shows flowcharts of methods enabled by decoupling the compute resources from storage as implemented by the cloud platform including a tiered storage in accordance with embodiments of the present disclosure.

DETAILED DESCRIPTION

Figure 1A:
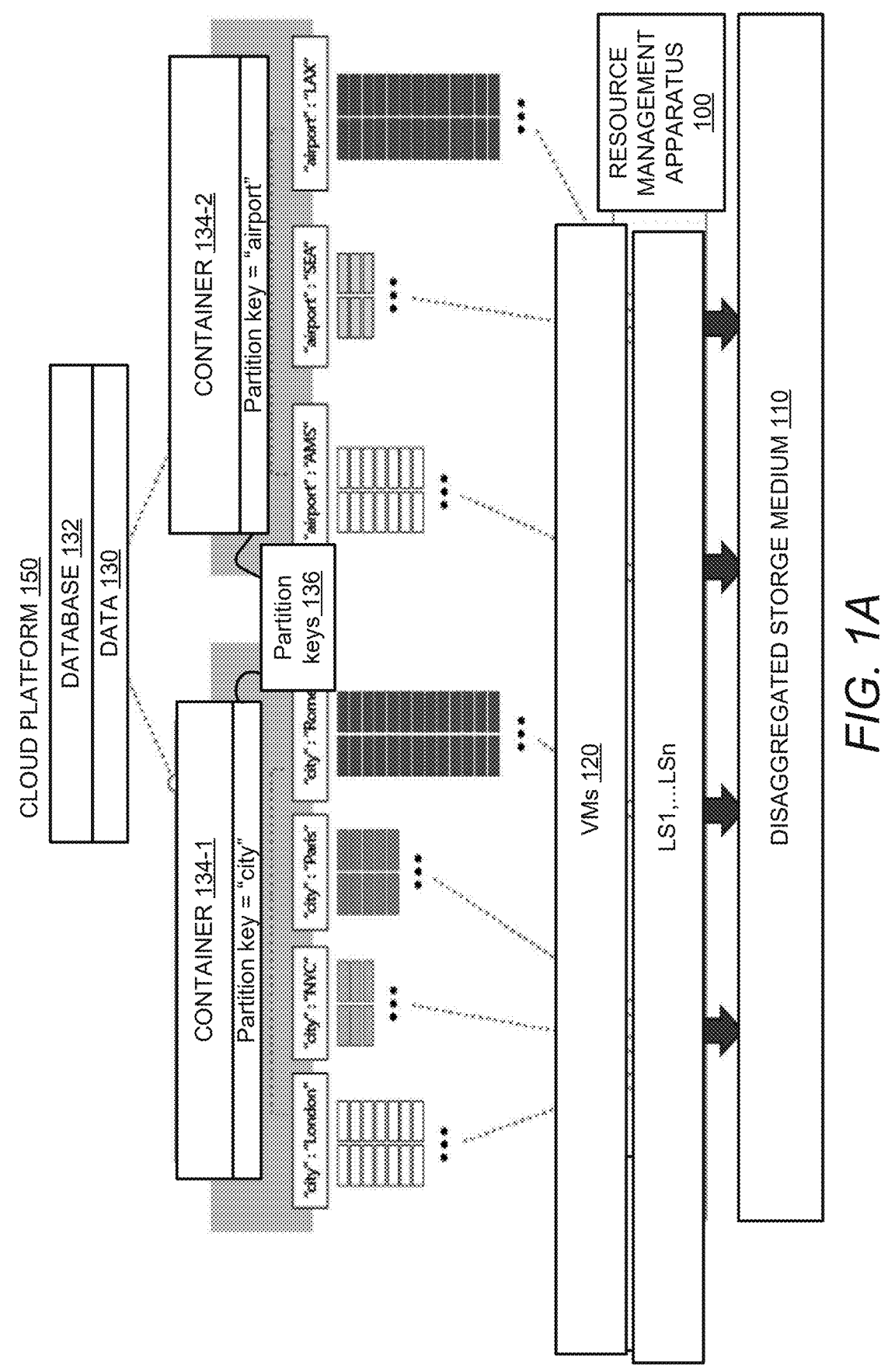
FIG. 1A shows a block diagram of a cloud platform implementing a tiered data storage scheme in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well-known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to.

An architecture that is widely in use in the database systems of cloud environments is the shared-nothing architecture, which requires storage and computing resources to be scaled together. Often, the entire data in a database of a cloud platform is not regularly accessed. However, in a shared-nothing architecture, the unused data continues to be stored in data structures built for high-availability (HA) conditions that fulfill stringent performance requirements. While the users may require large data storage to store data that is constantly being generated by the various devices, high availability of all the data thus generated is neither necessary nor desired. This is because, for the users, high availability translates into higher costs for data storage, while for the cloud providers, the data storage uses computational hardware resources that are better employed for other mission-critical applications. However, users may require at least a portion of the data to be accessible under HA conditions. Furthermore, the portion of data to be made available under HA conditions may differ from time to time. Many of these challenges can be addressed if the storage and computational resources can be scaled independently so that the computational resources can be flexibly assigned as required over a specified amount of data.

Disclosed herein is a 'shared-nothing, shared disc' based tiered storage system for cloud platforms which makes available a portion of the data that is frequently accessed as 'hot data' that fulfills conditions for HA while another portion of the data that is less frequently accessed is stored as 'cold data'. A resource management apparatus on the cloud platform includes a processor and memory storing processor-executable instructions as a request receiver, a data retriever, and a compute optimizer that enable implementation of the tiered storage. The hot data is stored in a local storage medium of a virtual machine (VM) on the cloud platform and the cold data is stored in a disaggregated storage medium that is shared by the VMs on the cloud platform. The VM receives data from a partition that is identified by a partition key. A local data manager within the VM stores the data including documents received from the partition to the local storage medium and in an in-memory table (memtable).

The memtable is an in-memory data structure that can have a fixed, predetermined maximum size and is used to store a copy of the hot data as a segment. When the memtable in a local storage medium attains the maximum size with the addition of the documents, the local data manager generates an immutable segment from the memtable and stores or flushes the immutable segment to the disaggregated storage medium. After the segment is flushed to the disaggregated storage, the memtable is deallocated by the local data manager, which continues to store the hot data in the local storage medium until certain criteria, e.g., time-to-cold (TTC criteria) are met. TTC criteria can include but are not limited to, temporal criterion, e.g., data is stored for a predetermined time, access criterion, e.g., data is accessed within a preceding predetermined time interval, or a combination of different criteria. When a memtable satisfies the TTC, the local data manager deletes the memtable from the local storage medium of the VM.

In an example, the local data manager formats the segment as a. avro file. The local data manager generates an index for a segment that includes a range of search keys (sk) associated with the various documents stored therein. Each document of the segment is identified uniquely by a search key, which is a combination of the partition key identifying the partition from which the document was received and a documentID. The disaggregated storage manager groups segments in the disaggregated storage medium into sorted runs based on consecutive corresponding partition keys or non-overlapping search key ranges in an ascending or descending search key order. Furthermore, the disaggregated storage manager assigns levels to the sorted runs based on time stamps so that newly formed sorted runs are placed in higher levels. The disaggregated storage manager generates metadata maps for storing metadata of the segments and sorted runs, which enables identification of the segments for search or other purposes.

The resource management apparatus includes a document retriever that enables the retrieval of documents based on a received search key. If the search key includes the partition key and the documentID, the document retriever can retrieve the document so identified. If, however, the search key does not include a documentID, then documents from the partition identified by the partition key are retrieved. If the search key includes only a documentID, then documents across partitions having the documentID can be retrieved. The documents are identified based on the metadata of the segments and the sorted runs stored in the metadata maps. The management apparatus also includes a compute optimizer that enables scaling up or scaling down Request Units (RUs) per user requirements. An RU is a unit of compute or performance currency abstracting the system resources such as the Central Processing Unit (CPU), Input/Output Operations Per Second (IOPS), and memory that are required to perform database operations on a cloud computing platform. Whether the database operation is a write, point read, or query, operations are measured in RUs. By way of illustration and not limitation, a point read (fetching a single item by its ID and partition key value) for a 1-KB item can be one Request Unit (or one RU), regardless of the Application Programming Interface (API) used to interact with the database.

When a request to scale up compute or Request Units (RUs) is received for a portion of storage in the disaggregated storage medium, the RUs in terms of additional VMs are instantiated, and the metadata including the addresses of the segments in the portion of the storage medium is passed to the newly instantiated VM. Therefore, the VM gains a 'view' of the portion of the disaggregated storage medium so that point reads, or document retrieval is enabled. Conversely, if a request to scale down the compute resources is received for a portion of the storage in the disaggregated storage medium, the VM(s) corresponding to the segments in the portion of the storage is deleted.

The tiered storage for cloud platforms disclosed herein enables a hybrid shared-nothing/shared-disk LSM-tree-based storage architecture. The resource management apparatus executes the various processes via backend components and stores data in the disaggregated storage medium, for example, in an open-source file format (.avro). The disclosed resource management apparatus and processes leverage the distributed nature of LSM trees to provide for a technical improvement enabling scaling up or scaling down resources as needed without movement of data. Since segments are clustered by partition keys and therefore, physical partitions can be scaled up and down easily by being given a partition key range logical view. Thus a view of immutable segments in the disclosed tiered storage scheme provides for greater elasticity as opposed to other architectures such as B-trees, where each compute instance may access fragmented pages of the mutable B-tree file which would require locking. Another technical improvement afforded by the disclosed tiered storage is that it is elastic enough to be scaled across the shared-nothing/shared-disc by user workloads. For example, if customers require high performance and availability for 100% of data, the customer can stay on a 100% shared-nothing architecture with the data being stored on the local storage only without being flushed to the disaggregated storage medium. If 100% performance is required only for 10% of data (hot data) and of data while resource efficiency/scalability, is preferred for the remaining 90% of the data then the service can switch to a hybrid shared-nothing/shared-disk architecture (tiered storage). If a customer prefers a serverless model where resources are assigned only when required, a 100% shared-disk architecture can be implemented so that the resource management apparatus can efficiently instantiate additional VMs without any data movement (serverless). Thus, the tiered storage scheme disclosed herein based on "shared-nothing, shared disc" architecture provides for a technical improvement over existing architectures in enabling more efficient or optimized use of computational resources as such resources can be instantiated as needed. The computational resources need not be assigned in advance as required by shared-nothing architecture nor do the computational resources have to be made completely inaccessible as in the serverless architecture.

FIG. 1A shows a block diagram of a cloud platform 150 implementing a tiered data storage scheme in accordance with an embodiment of the present disclosure. The cloud platform 150 receives data 130 from external data sources, e.g., database 132. By way of illustration and not limitation, a brief description of the external data sources is provided herein. In an example, the external data sources can be NoSQL data sources. The database 132 is logically partitioned into a number of containers or partitions 134-1 and 134-2 identified by corresponding partition keys 136 (PKs).

For example, as shown in FIG. 1A, the container 134-1 is characterized by partition key "city" while the container 134-2 is characterized by partition key "airport". The data 130 associated with different values of a particular partition key is transmitted to different VMs of a plurality of VMs on the cloud platform 150. A resource management apparatus 100 (hereafter referred to as 'the apparatus 100") is also included in the cloud platform 150. Each of the plurality of VMs also includes a corresponding local storage LS1, . . . , LSn, (n is a natural number and n=1, 2, 3, . . . ). A disaggregated storage medium 110 is shared by the plurality of VMs 120. The apparatus 100 implements a two-tiered data storage scheme for the clients of the cloud platform 150 based on the hybrid "shared nothing-shared disk" architecture. The "shared nothing-shared disk" architecture enables the apparatus 100 to store the data 130 as hot data on the hot tier including the local storage media e.g., LS1, . . . ,LSn corresponding to a plurality of VMs 120 and as cold data on the cold tier that includes the disaggregated storage medium 110 as further detailed herein.

Figure 1B:
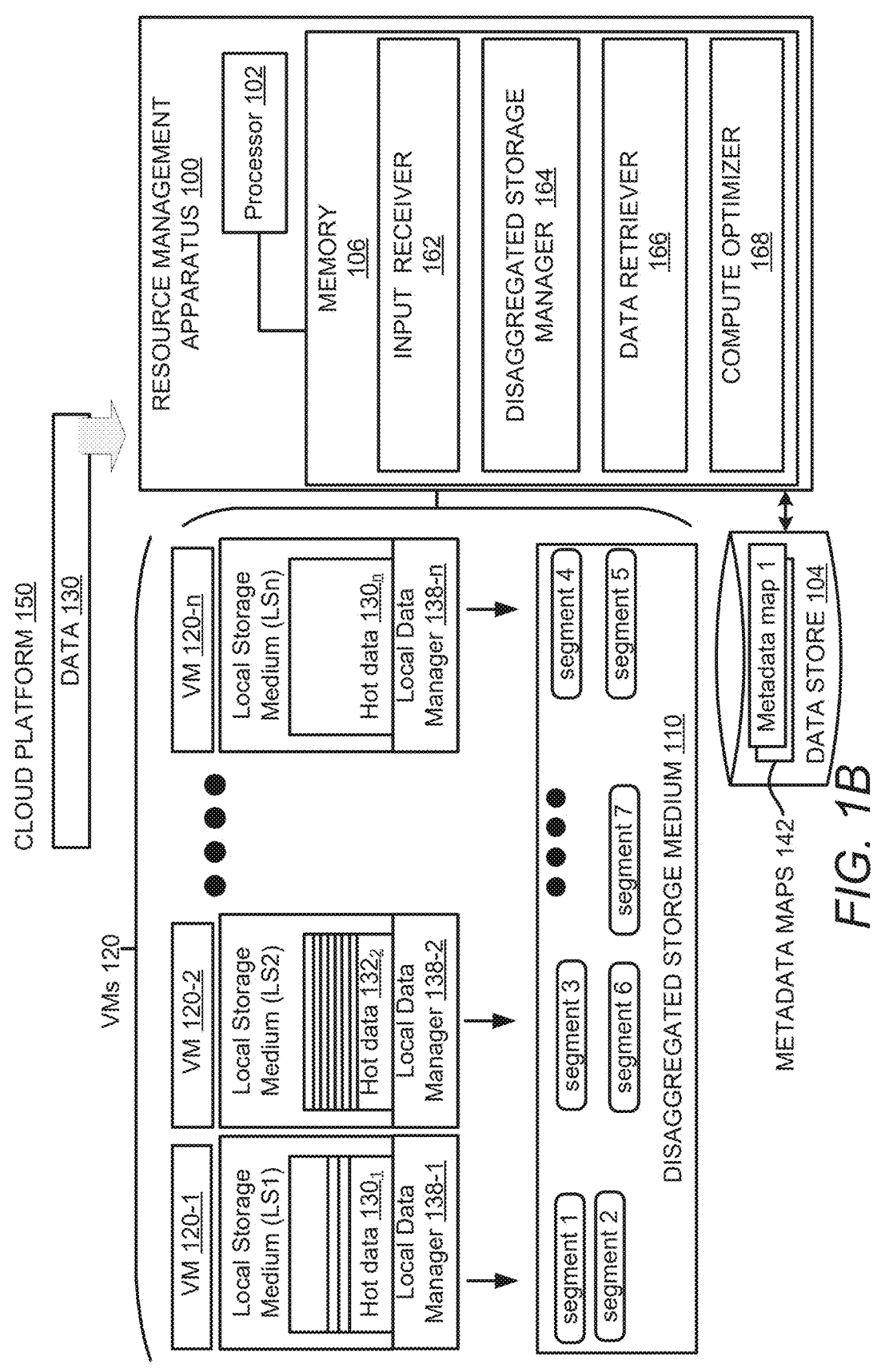
FIG. 1B shows a resource management apparatus in the cloud platform shown in FIG. 1A, in accordance with an embodiment of the present disclosure.

FIG. 1B shows the cloud platform 150 with the resource management apparatus 100 shown in FIG. 1A, in accordance with an embodiment of the present disclosure. The apparatus 100 includes a processor 102 coupled to a data store 104 and a memory 106 that stores modules with programming instructions to implement the tiered storage scheme disclosed herein. The memory 106 includes an input receiver 162 that executes background processes to collect data 130 to be stored in the two tiers, a 'hot tier' and a 'cold tier' of the cloud platform 150. The memory 106 further includes a disaggregated storage manager 164 that manages 'hot data' and 'cold data' in the hot and cold tiers. A data retriever 166 enables retrieval of records or documents from one or more of the local storages and the disaggregated storage medium 110 and a compute optimizer 168 instantiates new VMs or deletes existing VMs as needed for processing the cold data in the disaggregated storage medium 110. The various operations and processes executed by the different components of the cloud platform 150 to enable resource-efficient two-tiered storage will be described herein.

Each of the plurality of virtual machines (VMs) 120, e.g., VM 120-1, VM 120-2, . . . VM 120-n, hosted on the cloud platform 150 is associated with a corresponding local storage. LS1 is the local storage corresponding to VM 120-1, LS2 is the local storage of VM 120-2, etc. In an example, the local storage of a VM can include a solid state drive (SSD) of a computer that accesses the particular VM. The local storage of a given VM, e.g., LS1 of VM 120-1 is configured to store the data corresponding to the partition key(s). For example, if LS1 is the local storage for partition key, city="London" and the data 130 includes an update to London data then the disaggregated storage manager 164 stores the data 130 in LS1. However, it may be noted that the data corresponding to a particular partition key is not split across the local storage media. For example, LS1 stores the entire data for partition keys "London" and "NYC" so that this data is not stored in any other local storage media. The hot data $130_1$ in the local storage medium, e.g., LS1, is deleted when preconfigured threshold criteria or condition(s) (Time to Cold (TTC)) are met. Each of the plurality of VMs 120 also includes a corresponding local data manager 138-1,138-2, . . . 138-n.

A local data manager, e.g., local data manager 138-1, formats the data to be stored to the disaggregated storage medium 110 into immutable "segments". An immutable segment is a file of a defined size (e.g., threshold size) including documents from the same or different partitions which once sealed cannot be changed. While the functions of the local data manager are described below with reference to the local data manager 138-1, it can be understood that such description is equally applicable to other local data managers 138-2, . . . , 138-n, unless otherwise specified. The local storage media LS1, LS2, . . . , and LSn, write their documents into immutable segments. When a segment is full, the local data manager 138-1 seals the segment and stores a copy of the sealed segment in the disaggregated storage medium 110. For example, the hot data $130_1$ in LS1 shows a partially filled segment, hot data $130_2$ in LS2 shows a filled segment that can be sealed while hot data $130n$ in LSn shows an empty segment. The different segments 1-7 shown in the disaggregated storage medium 110 are filled segments that were flushed from one or more of the local storage media LS1, LS2, . . . , LSn. The disaggregated storage manager 164 maintains one or more metadata maps 142 for identifying segments in the disaggregated storage medium 110 for query processing or other purposes as detailed herein. In an example, the disaggregated storage medium 110, which may be referred to as a single entity, includes a network of multiple storage devices that store data configured into a specific format by the apparatus 100.

Under the tiered storage scheme, access to hot data $130_1$ stored on LS1 fulfills certain Service Level Agreement (SLA) criteria which may specify terms such as high availability (HA), etc., while the access to cold data on disaggregated storage medium 110 does not fulfill the certain SLA. Therefore, the apparatus 100 assigns computing resources, (e.g., Request Units (RUs)) to the local storage of the plurality of VMs 120. When TTC expires, the local data manager 138-1 deletes the hot data $130_1$ of VM 120-1 from LS1 while cold data remains on the disaggregated storage medium 110. TTC can be set based on user requirements and criteria. TTC can be defined in terms of one or more criteria such as, but not limited to, temporal criteria, frequency and/or recency of access, etc.

In different examples, the apparatus 100 is a computing device, such as a server, a laptop computer, a desktop computer, a tablet computer, and/or the like. In some examples, the servers are part of a cloud infrastructure, a virtual machine in the cloud infrastructure, a computing device of an Information technology (IT) professional of the cloud infrastructure, a computing device of an IT professional contracted by the service provider of the cloud infrastructure, etc.

With respect to FIGS. 1A and 1B, the processor 102 is a semiconductor-based microprocessor, a central processing unit (CPU), an application-specific integrated circuit (ASIC), a field-programmable gate array (FPGA), and/or other hardware device. The memory 106 may also be termed a computer-readable medium and is, for example, a Random Access memory (RAM), an Electrically Erasable Programmable Read-Only Memory (EEPROM), a storage device, or the like. In some examples, the memory 106, is a non-transitory computer-readable storage medium, where the term "non-transitory" does not encompass transitory propagating signals. In any regard, the memory 106, has stored thereon machine-readable instructions executable respectively by processor 102. Similarly, each of the data store 104 may also be a Random Access memory (RAM), an Electrically Erasable Programmable Read-Only Memory (EEPROM), a storage device, or the like.

Although the apparatus 100 is depicted as having a single processor, it should be understood that the apparatus 100 may include additional processors and/or cores without departing from the scope of apparatus 100. In this regard, references to a single processor 102, as well as to a single memory 106, may be understood to additionally or alternatively pertain to multiple processors 102 and/or multiple memories 106. In addition, or alternatively, the processor 102 and the memory 106 may be integrated into a single component, e.g., an integrated circuit on which both the processor 102 and the memory 106 may be provided. In addition, or alternatively, the operations described herein as being performed by the processor 102 can be distributed across multiple corresponding apparatuses 100 and/or multiple processors 102.

Figure 2A:
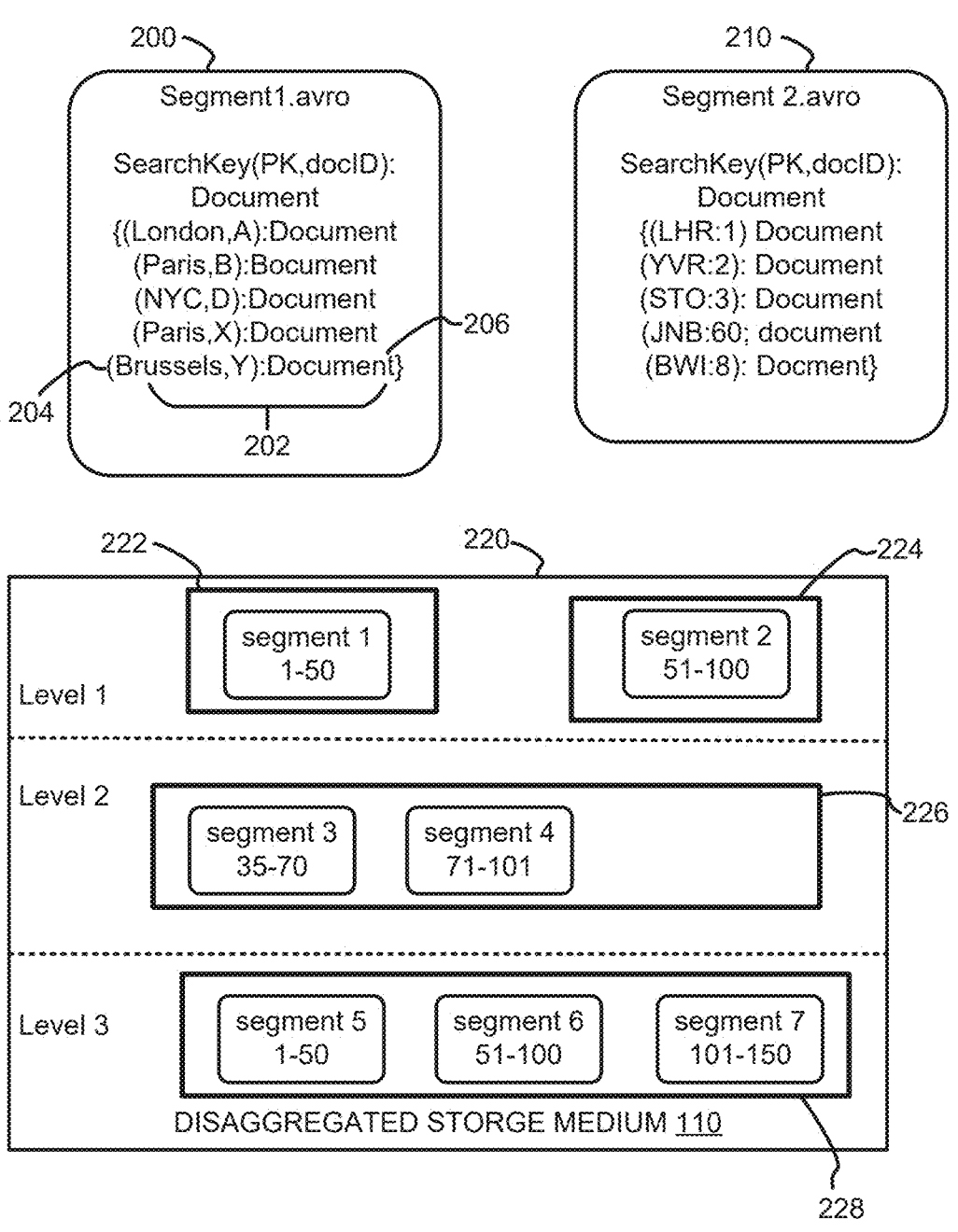
FIG. 2A shows block diagrams of segments, formatted in accordance with embodiments of the present disclosure.
Figure 2B:
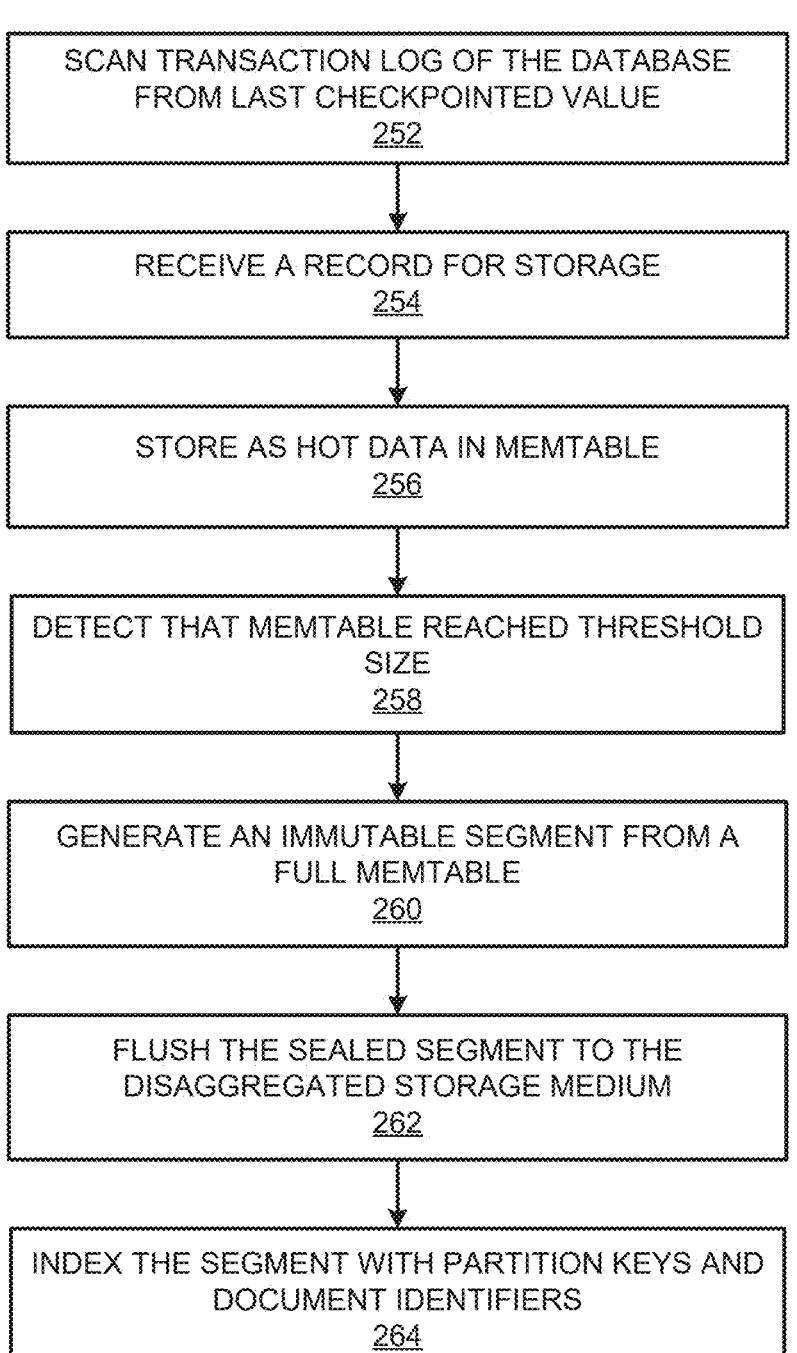
FIG. 2B shows a flowchart of a method of formatting received data in accordance with embodiments of the present disclosure.
Figure 2C:
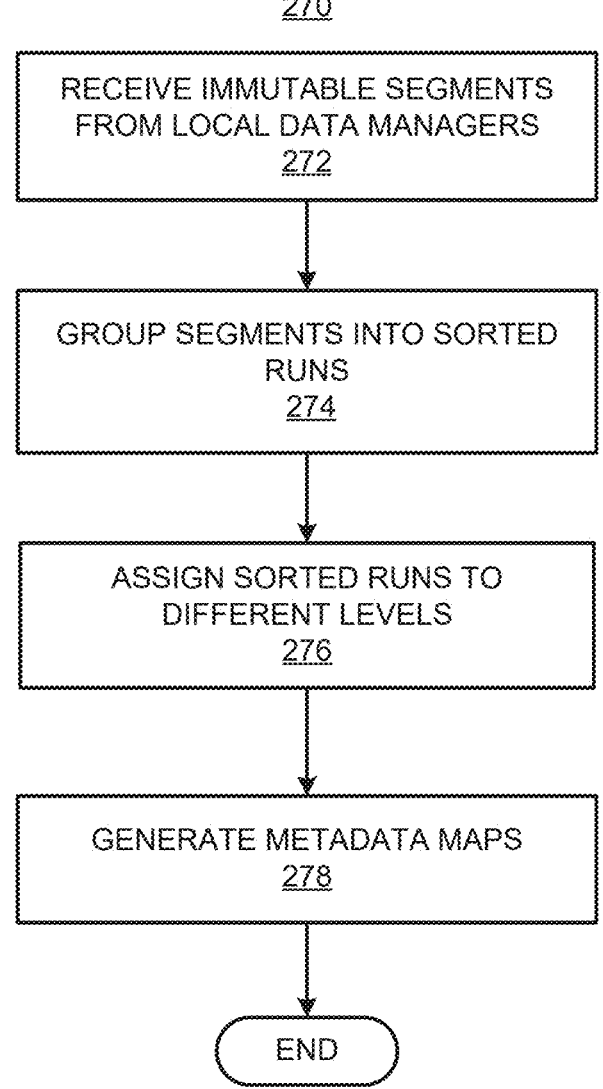
FIG. 2C shows a flowchart of a method of storing data in the cold tier of the cloud platform in accordance with embodiments of the present disclosure.

FIG. 2A shows block diagrams 200 and 210 of two segments, formatted in accordance with embodiments of the present disclosure and FIGS. 2B and 2C show flowcharts of respective methods 250 and 270 of formatting the received data 130 for storage to the cold tier in accordance with embodiments of the present disclosure. The methods 250 and 270 of FIGS. 2B and 2C will be described with reference to the block diagrams of FIG. 2A.

In some examples, the tiered storage is based on distributed Log-structured merge trees (LSM trees) that handle both write and read operations efficiently with in-memory and disk-based storage structures. The LSM tree is distributed across physical partitions, e.g., the local storage media LS1, LS2, . . . , LSn, and hence can be viewed as n separate LSM trees where n is the number of physical partitions. Data 130 including records from the database 132 is ingested into the disaggregated storage medium 110 from a background task via memtables or in-memory maps sorted by a Search-Key <PK, userDocID>. When a memtable in one of the local storage media LS1, LS2, . . . , LSn, reaches the threshold size, the corresponding local data manager flushes the memtable to the disaggregated storage medium 110 as a segment, e.g., segment1.

The data collection and formatting process begins at 252 with the input receiver 162 scanning the transaction log of the database 132 from the last checkpointed value for updates to any of the records associated with the partition keys corresponding to the local storage media LS1, . . . LSn. At 254, a VM, e.g., VM1 receives a record including an update to a document associated with the corresponding partition key. The local data manager 138-1 stores the record at 256 as hot data 130₁ to the local storage LS1 as part of a memtable or segment. The record is identified with metadata that includes a search key, which is a combination of the partition key and documentID. It is noted that each of the partitions, e.g., local storage medium LS1, LS2, etc., has multiple documents and hence a number of documents can share the same partition key while each of the documents is identified by a documentID, which is unique within the partition but two documents in different partitions can have the same documentID and hence a combination of partition key and documentID uniquely identifies the document across partitions and is designated as the search key. Besides the metadata, the record in the memtable also includes the document. For example, a record 202 includes a search key 204 along with the document 206 identified by the search key 204. Since the memtable is in a local storage medium of a VM and the local storage medium only stores data for a particular partition key, data associated with the particular partition key is stored in the memtable.

When a sufficient number of records is stored in the memtable, the local data manager 138-1 detects that the memtable has reached a threshold size at 258 and seals the memtable to generate an immutable segment at 260. In some examples, a segment is an immutable. avro file of fixed size. At 262, the local data manager 138-1 seals the filled-up segment and flushes the filled-up segment to the disaggregated storage medium 110 to be stored as part of cold data. For example, Segment1.avro 200 stores records having different values for partition key="City". Similarly, Segment2.avro 210 stores records having different values for partition key="Airport". It may be appreciated that flushing of segments to the disaggregated storage medium 110 is, in some examples, independent of the occurrence of the TTC and depends only on the memtables reaching the threshold size so that the memtables that reach the threshold size continue to be stored as hot data until the TTC criteria are attained. Also, the local data manager 138-1 indexes the segments with the corresponding metadata including the partition key and documentIDs at 264. The metadata of the segment includes without limitation, a Log Sequence Number (LSN), an identifier assigned to a record or document, and corresponding metadata in the segment, segment ID, file IDs, bloom filter, segment size, number of tombstones, search key range, etc.

FIG. 2C shows a flowchart of a method 270 of storing data to a cold tier as implemented by the disaggregated storage manager 164 in accordance with an embodiment of the present disclosure. At 272, the immutable segments generated and flushed by the various local data managers 138-1, 138-2, . . . , 138-n, are received in the disaggregated storage medium 110. At 274, the disaggregated storage manager 164 groups segments into sorted runs, e.g. 222, 224, 226, and 228, based on non-overlapping search key ranges and are arranged in an ascending or descending search key order. For example, as shown at 220, segment 3 includes a search key range 30-70 while segment 4 includes a search key range of 71-101. Since each segment is also ordered by a search key, a sorted run can only contain exactly one copy of a search key.

At 276, the disaggregated storage manager 164 also assigns levels to the sorted runs by creating the corresponding metadata. For example, level 1, level 2, and level 3 are shown at 220. Each level can have one or more sorted runs, e.g., level 1 has two sorted runs 222 and 224 with one segment each while level 2 has a sorted run 226 with two segments, and level 3 has a sorted run of three segments. Levels are logical metadata concepts and a level is assigned based on the timestamps associated with the segments in the sorted runs with newer sorted runs stored in upper levels. A large amount of data is on the lower levels so a larger number of levels results in greater compaction. Segment compaction enables simplification of the search for documents in the disaggregated storage medium 110, de-duplication of the records, and updating of the segments corresponding to the updates to the database 132 such as but not limited to edits and deletion of records, etc. The disaggregated storage manager 164 assigns levels to the sorted runs by generating two maps of metadata at 276. One metadata map, maps levels to the corresponding list of sorted runs, and another metadata map maps sorted runs to a list of segments in the sorted run.

Figure 3A:
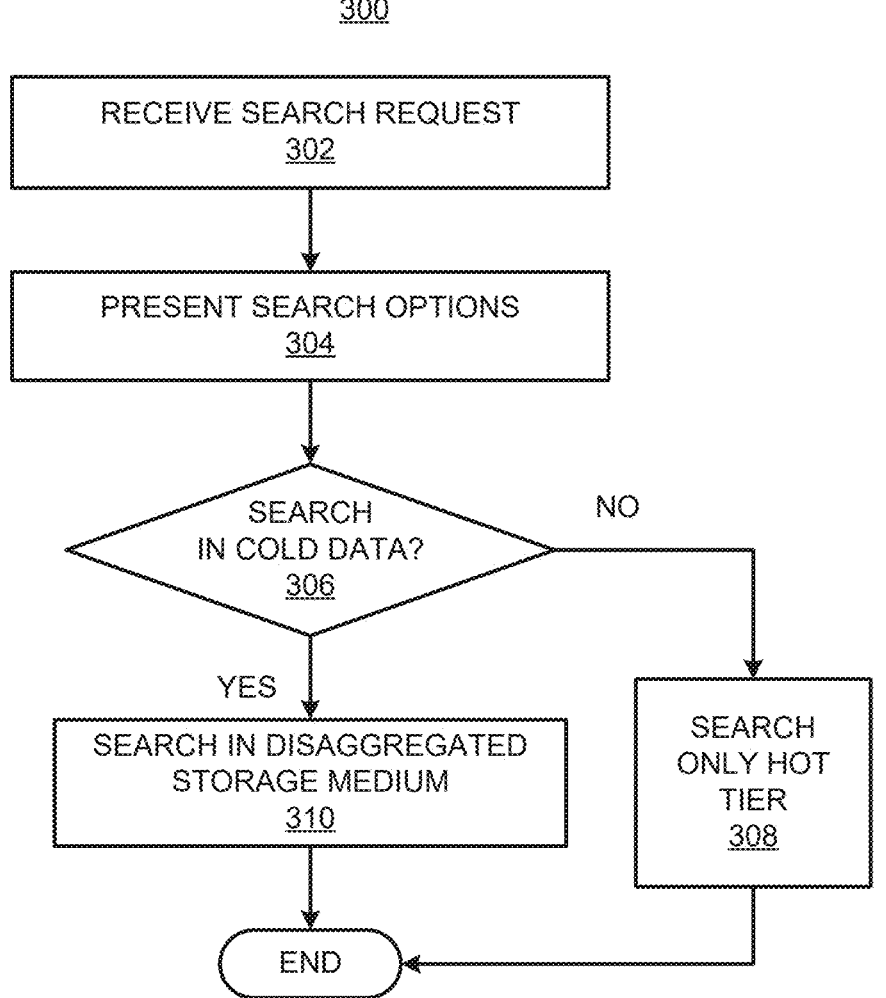
FIG. 3A shows a flowchart of a method for processing a search request for a document in multiple tiers in accordance with embodiments of the present disclosure.

FIG. 3A shows a flowchart of a method 300 for processing a search request for a record/document in two tiers as implemented by the data retriever 166 in accordance with embodiments of the present disclosure. At 302, the processor 102 executing instructions in the data retriever 166 receives a search key of a document to be retrieved. As mentioned above, a search key is formed from a combination of the partition key and the documentID. Hence, one or more of the partition keys and documentID can be provided as the search key and the search request produces results based on the completeness of the search key. If the complete search key is provided, the data retriever 166 provides a document uniquely identified by the combination of the partition key and the document ID as a search result. If only the partition key is provided, the data retriever 166 retrieves the documents associated with the partition key from the corresponding segment(s). Also, if no partition key is included in the search key, and only a documentID is provided, the data retriever 166 retrieves the various documents identified by the documentID across different partitions.

When the data retriever 166 receives a search request at 302, the data retriever 166 provides various search options at 304 such as whether the search should be conducted only in the hot tier or if the cold tier should also be searched. For example, the data retriever 166 provides a selectable control, e.g., an option button/checkbox at 304 which can be selected if the user wants to search the cold tier also. At 306, the data retriever 166 determines if the cold tier should also be searched based on the selected option. If the user does not select the control, the data retriever 166 searches only the hot tier, e.g., the hot data in the local data storage of the VM issuing the search request at 308. If the cold data option is selected, the data retriever 166 also searches the cold tier, i.e., the disaggregated storage medium 110 at 310.

Figure 3B:
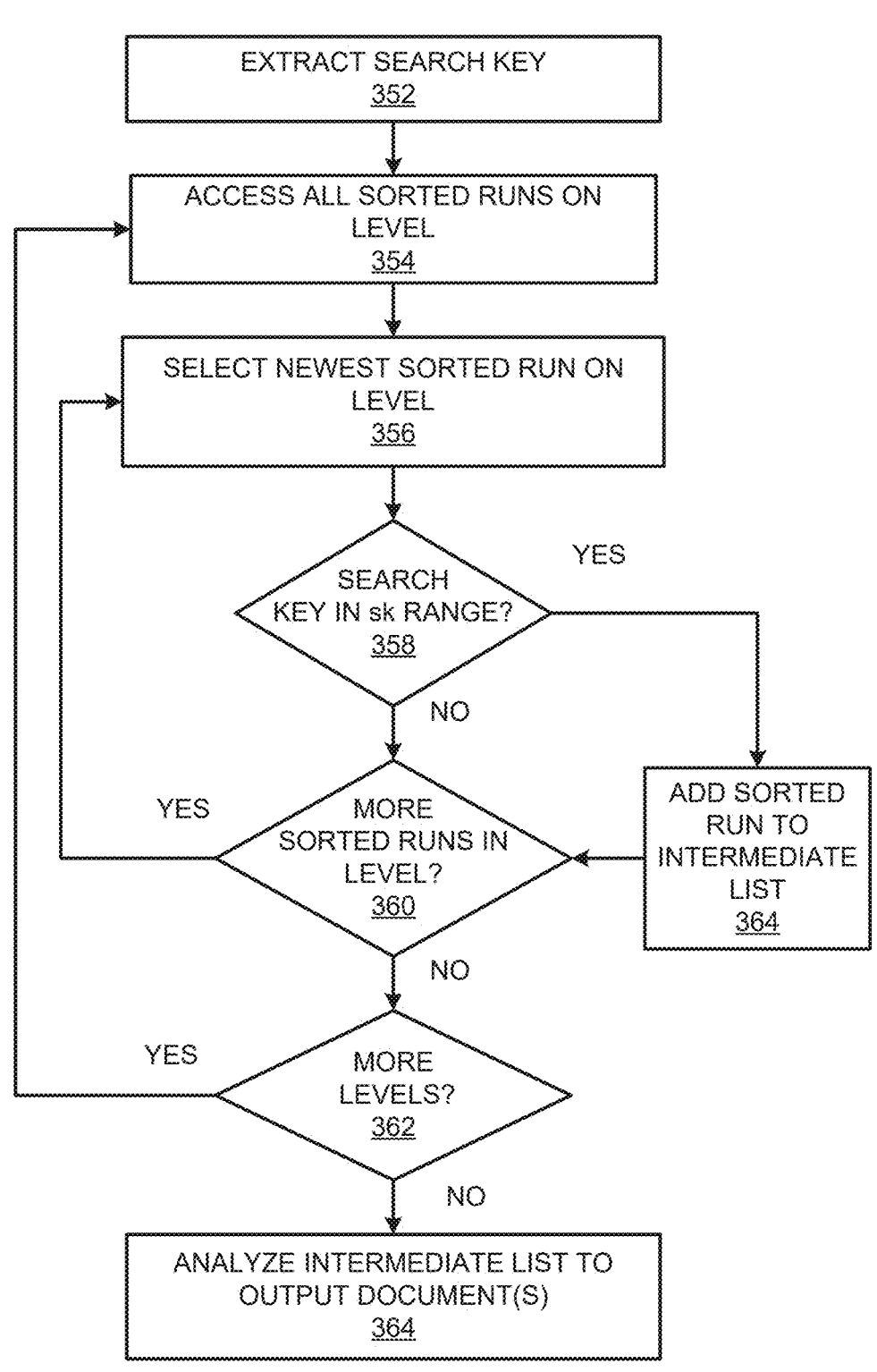
FIG. 3B shows a flowchart of a method for searching the cold tier in accordance with the embodiments of the present disclosure.

FIG. 3B shows a flowchart of a method 350 for searching the cold tier implemented by the data retriever 166 in accordance with an embodiment of the present disclosure. When the search request with an indication to search the cold data is received, the process begins at 352 with the processor 102 executing instructions in the data retriever 166 to extract the search key of a document to be retrieved, for example, via textual processing of the search request. At 354, the data retriever 166 accesses all the sorted runs on the top-most level, e.g., L0. At 356, the data retriever 166 selects the newest sorted run, e.g., the sorted run with the latest time stamp among all the sorted runs on the accessed level. At 358, the data retriever 166 determines if the received search key is within the search key range of the selected sorted run. If the search key is not within the search key range of the selected sorted run, the data retriever 166 determines at 360 if further sorted runs are to be processed in the accessed level. If the search key is within the search key range of the selected sorted run, the data retriever 166 adds the sorted run to an intermediate list at 364.

The data retriever 166 further determines at 360 if more sorted runs remain for processing at the accessed level. If yes, the data retriever 166 selects the next sorted run on the accessed level at 356, else, the data retriever 166 determines if further levels remain for processing at 362. If the data retriever 166 determines that no further levels remain for processing, the data retriever 166 analyzes the intermediate list contents based on the extracted search key at 364 to retrieve the requested document. If the data retriever 166 determines at 362 that further levels remain to be searched, the data retriever 166 returns to 354 to access the sorted runs in the next level, e.g., L1. When analyzing the sorted runs in the intermediate list for the search key at 366, the data retriever 166 uses segment metadata such as the bloom filter which is a probabilistic data structure that is based on hashing and is typically used to add elements to a set or test if an element is in a set. The bloom filter output is used to determine if the search key might be present in the segment. If the requested document is present in the segment, the data retriever 166 downloads the segment for example, into the data store 104, and provides the requested document from the downloaded segment.

Figure 4A:
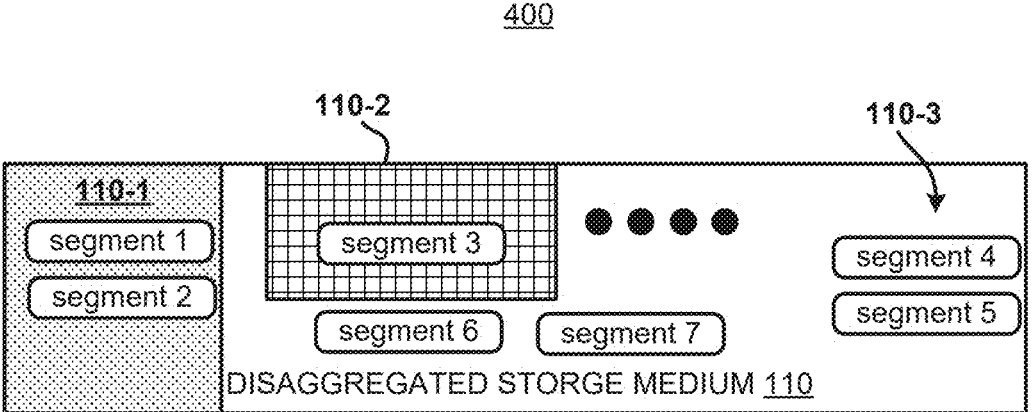
FIG. 4A shows a block diagram of the disaggregated storage medium in accordance with embodiments of the present disclosure.

FIG. 4A shows a block diagram 400 of the disaggregated storage medium 110 that allows the scale-up of computing resources as required in accordance with an embodiment of the present disclosure. The disaggregated storage medium 110 can provide multiple logical views, e.g., 110-1, 110-2, 110-3, for different physical partitions so that physical data is unaffected by the compute provisioned. While certain views, e.g., 110-1 and 110-2 provide for exclusive views to corresponding VMs, certain views, e.g., 110-3 can be accessed commonly by multiple VMs. The processes of assigning views to de-couple computing resources from storage as implemented by the compute optimizer 168 are described below.

FIG. 4B shows flowcharts of two methods 450 and 470 enabled by de-coupling the compute resources from storage as implemented by the cloud platform 150 including a tiered storage in accordance with embodiments of the present disclosure. The requests to scale up or scale down the compute resources can be indirectly generated by a user. The number of additional RUs depends on the partitions. For example, to support X number of RUs, Y number of partitions may be required. The compute optimizer 168 translates the increase in the number of RUs to a scale up of partitions as detailed infra. The method 450 of scaling up compute resources or configuring additional RUs begins at 452. The processor 102 executes instructions of the compute optimizer 168 to receive a request for allocation of additional Request Units (RUS) for at least a portion of the cold data at 452. In an example, the request identifies a particular partition for which compute resources or RUs are to be scaled up. At 454, the compute optimizer 168 identifies the partition key(s) or documents for which the compute resources are to be scaled for example, from the request. The processor 102 via the compute optimizer 168 instantiates one or more new, additional VMs at 456 in response to the request for allocation of the additional RUs. The compute optimizer 168 identifies a subset of the segments in the disaggregated storage associated with the partition key(s) at 458. The compute optimizer 168 passes the metadata of the identified segments such as storage location addresses within the disaggregated storage medium 110 to the instantiated VMs at 460. Hence, the additional VMs are able to "view" the segments so that the documents of the segments can be accessed for point reads. Thus, compute resources are dissociated from the storage so that the storage location addresses can be passed to the scaled-up compute resources without having to copy or move the data. Some of the VMs can have exclusive views of different segments or multiple VMs can commonly view some segments.

The method 470 of scaling down the compute resources or removing RUs begins at 472. The processor 102 executes instructions of the compute optimizer 168 to receive a request to scale down compute resources associated with a particular partition identified in the request. At 474, the compute optimizer 168 identifies the partition key(s) for which the compute resources are to be scaled down, for example, from the request. The processor 102, via the compute optimizer 168 identifies the VMs accessing the segments associated with the partitions at 476. The compute optimizer 168 deletes the VMs identified at 478. Thus, the compute resources are decoupled from the storage so that the compute resources can be scaled up or scaled down while keeping the cold data unchanged.

Various manners in which the processor 102 of the apparatus 100 operates are discussed in greater detail with respect to the methods 250, 270, 300, 450, and 470 respectively depicted in FIGS. 2B, 2C, 3 and 4B. It should be understood that these processes may include additional operations and that some of the operations described therein may be removed and/or modified without departing from the scope.

In some examples, some or all of the operations set forth in the methods 250, 270, 300, 450, and 470 are included as utilities, programs, or subprograms, in any desired computer accessible medium. In some examples, the methods 250, 270, 300, 450, and 470 are embodied by computer programs, which may exist in a variety of forms both active and inactive. For example, the computer programs exist as machine-readable instructions, including source code, object code, executable code or other formats. Any of the above, in some examples, are embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus, comprising:

a processor; and a memory on which are stored machine-readable instructions that when executed by the processor, cause the processor to:

store, as cold data in a disaggregated storage medium, immutable segments from Virtual Machines (VMs), wherein the immutable segments include documents from partitions that are characterized by corresponding partition keys;

format the cold data into sorted runs, wherein a sorted run includes at least one of the immutable segments that is arranged in non-overlapping search key ranges and wherein search keys correspond to the documents and a search key of a document includes corresponding partition key and a documentID of the document;

assign the sorted runs to corresponding levels of multiple levels based on timestamps of the sorted runs; and generate metadata maps that store metadata identifying the immutable segments and the sorted runs including the immutable segments.

2. The apparatus of claim 1, wherein the machine-readable instructions further cause the processor to:

enable searching for corresponding documents in the cold data via the search keys.

3. The apparatus of claim 2, wherein to enable searching for corresponding documents in the cold data via the search keys, the machine-readable instructions further cause the processor to:

receive a search key associated with a document of the corresponding documents to be retrieved from the disaggregated storage medium, wherein the received search key includes one or more of a partition key and a document ID.

4. The apparatus of claim 3, wherein to enable searching for corresponding documents in the cold data via the search keys, the machine-readable instructions further cause the processor to:

identify a corresponding level of the multiple levels and a sorted run in the disaggregated storage medium with a search key range including the received search key when the received search key includes the partition key and the document ID.

5. The apparatus of claim 4, wherein the machine-readable instructions further cause the processor to:

retrieve the document based on a bloom filter output that determines that the received search key is present in a segment of the sorted run in the corresponding level.

6. The apparatus of claim 3, wherein to enable searching for corresponding documents in the cold data via the search keys, the machine-readable instructions further cause the processor to:

output documents retrieved from a corresponding partition based on the search key including only a partition key.

7. The apparatus of claim 1, wherein the machine-readable instructions further cause the processor to:

receive a request for allocation of additional Request Units for at least a portion of the cold data;

instantiate an additional VM in response to receipt of the request for allocation of additional Request Units for at least a portion of the cold data; and enable the additional instantiated VM to access the at least a portion of the cold data by passing metadata of a subset of the immutable segments in the at least a portion of the cold data.

8. The apparatus of claim 7, wherein to allocate the additional Request Units for at least the portion of the cold data, the machine-readable instructions further cause the processor to:

identify the sorted runs that include a subset of the immutable segments from the portion of the cold data.

9. The apparatus of claim 8, wherein to allocate the additional Request Units for at least the portion of the cold data the machine-readable instructions further cause the processor to:

provide access to the identified sorted runs to the additional VM.

10. A processor-executable method comprising:

storing, by a processor, as cold data in a disaggregated storage medium, received data including documents from partitions that are characterized by corresponding partition keys;

formatting, by the processor, the cold data into sorted runs assigned to multiple levels, wherein each sorted run includes at least one segment and the sorted runs are identified by corresponding search key ranges, and wherein search keys correspond to the documents and a search key of a document includes corresponding partition key and a documentID;

receiving, by the processor, a scale-up request for allocation of additional Request Units for a first portion of cold data stored on a disaggregated storage medium;

instantiating, by the processor, an additional virtual machine (VM) in response to a request for allocation of additional Request Units; and enabling, by the processor, the additional VM to access the first portion of the cold data by passing metadata including addresses of segments in the first portion of the cold data.

11. The method of claim 10, wherein the additional VM is enabled for point reads of documents in the cold data.

12. The method of claim 10, further comprising:

receiving, by the processor, a scale-down request for a second portion of the cold data; and deleting, by the processor, a VM accessing the second portion while keeping the cold data unchanged.

13. The method of claim 10, wherein enabling the additional VM to access the first portion further comprises:

enabling, by the processor, the additional VM to access the first portion of the cold data while keeping the cold data unchanged.

14. A non-transitory computer readable storage medium having instructions stored thereon that, when executed by a processing device, cause the processing device to:

store, as cold data in a disaggregated storage medium, immutable segments from Virtual Machines (VMs), wherein the immutable segments include documents from partitions that are characterized by corresponding partition keys;

format the cold data into sorted runs, wherein a sorted run includes at least one of the immutable segments that is arranged in non-overlapping search key ranges and wherein search keys correspond to the documents and a search key of a document includes corresponding partition key and a documentID of the document;

assign the sorted runs to corresponding levels of multiple levels based on timestamps of the sorted runs; and generate metadata maps that store metadata identifying the immutable segments and the sorted runs including the immutable segments.

15. The non-transitory computer readable storage medium of claim 14, wherein the machine-readable instructions further cause the processor to:

enable searching for corresponding documents in the cold data via the search keys.

16. The non-transitory computer readable storage medium of claim 15, wherein to enable searching for corresponding documents in the cold data via the search keys, the machine-readable instructions further cause the processor to:

receive a search key associated with a document of the corresponding documents to be retrieved from the disaggregated storage medium, wherein the received search key includes one or more of a partition key and a document ID.

17. The non-transitory computer readable storage medium of claim 16, wherein to enable searching for corresponding documents in the cold data via the search keys, the machine-readable instructions further cause the processor to:

identify a corresponding level of the multiple levels and a sorted run in the disaggregated storage medium with a search key range including the received search key when the received search key includes the partition key and the document ID.

18. The non-transitory computer readable storage medium of claim 17, wherein the machine-readable instructions further cause the processor to:

retrieve the document based on a bloom filter output that determines that the received search key is present in a segment of the sorted run in the corresponding level.

19. The non-transitory computer readable storage medium of claim 16, wherein to enable searching for corresponding documents in the cold data via the search keys, the machine-readable instructions further cause the processor to:

output documents retrieved from a corresponding partition based on the search key including only a partition key.

20. The non-transitory computer readable storage medium of claim 14, wherein the machine-readable instructions further cause the processor to:

receive a request for allocation of additional Request Units for at least a portion of the cold data;

instantiate an additional VM in response to receipt of the request for allocation of additional Request Units for at least a portion of the cold data; and enable the additional instantiated VM to access the at least a portion of the cold data by passing metadata of a subset of the immutable segments in the at least a portion of the cold data.

\* \* \* \* \*